United States Patent [19]

Blatter

[11] 4,142,170

[45] Feb. 27, 1979

[54] HIGH RESPONSE TEMPERATURE SENSOR

[75] Inventor: Albert Blatter, Southfield, Mich.

[73] Assignee: The Bendix Corporation, Southfield, Mich.

[21] Appl. No.: 857,557

[22] Filed: Dec. 5, 1977

[51] Int. Cl.² ............................................. H01C 7/00
[52] U.S. Cl. ...................................... 338/28; 73/204; 338/25
[58] Field of Search ................. 338/22 R, 22 SD, 25, 338/28, 30; 73/362 AR, 27 R, 204; 357/28; 29/612

[56] References Cited

U.S. PATENT DOCUMENTS

| | | | |
|---|---|---|---|
| 1,996,943 | 4/1935 | Wile | 73/204 |
| 2,818,482 | 12/1957 | Bennett | 378/30 |
| 3,832,668 | 8/1974 | Berman | 338/22 SD |
| 3,890,588 | 6/1975 | Kunaya et al. | 338/28 |
| 3,918,018 | 11/1975 | Tuley | 338/28 |
| 4,065,760 | 12/1977 | Feldon | 338/28 X |

*Primary Examiner*—C. L. Albritton
*Attorney, Agent, or Firm*—Gaylord P. Haas, Jr.; Russel C. Wells

[57] ABSTRACT

A fast response fluid temperature sensor is disclosed which consists of a silicon temperature sensing semiconductor chip mounted on an extremely thin fin having a high surface area to mass ratio. The fin being formed in the shape of a dome to fully enclosed the semiconductor chip and protect the connections thereto from contaminants, mechanical damage and corrosive materials. The fin and chip combination are mounted in a frame assembly, the thermal conductivity of the frame assembly being low and the specific heat thereof being low. Foamed material may be inserted in the dome to further protect the chip and lead thereto from damage.

7 Claims, 5 Drawing Figures

HIGH RESPONSE TEMPERATURE SENSOR

BACKGROUND OF THE INVENTION

1. Field of the Invention

This invention relates generally to a fluid temperature sensor and more specifically to a fluid temperature sensor of the semiconductor type, the semiconductor chip being placed in a thin dome having a high surface area to mass ratio thereby providing an extremely fast acting temperature sensing unit.

2. Description of the Prior Art

As described above, the present invention relates to a temperature sensor which will provide a fast response device suitable for use in control systems where a rapid temperature sensing of a flowing fluid media is required. A typical use of such a temperature sensor would be in conjunction with the air induction system in an automotive engine wherein the air temperature is utilized in conjunction with other engine parameters for controlling the fuel in a fuel management system.

There are devices presently on the market which are similar to that which is to be described, but do not provide the extremely fast temperature response associated with the sensor of the present invention. In the temperature sensors presently being manufactured, for example by the Texas Instruments Corporation, the temperature sensing element is a silicon chip semiconductor which is doped by various impurities to control the resistance of the chip in response to variations in temperature. The silicon semiconductor chips are sized as blocks of approximately 0.015 × 0.015 × 0.006 inch dimension, the blocks being bonded to a metal plate on one side and a gold wire attached to the opposite side of the chip in typical semiconductor manufacturing fashion. The chip is then bonded to a metallic frame which is used as the base of the device, which frame is approximately 500 times the mass of the silicon chip. The entire assembly is then encased in a plastic molding for handling and installation strength.

The metallic frame utilized as the base of the device is of a thick cross-sectional area and relatively short in length thereby providing a low surface area to mass ratio. Further, the plastic incapsulant which has been made a structural part of the device has a low thermal conductivity compared to metal and thus impedes the flow of heat to or from the silicon chip. This incapsulant has been utilized due to the structural design of the assembly.

In two co-pending applications, commonly assigned, Ser. Nos. 857,558 and 857,559, filed Dec. 5, 1977, there is disclosed a fast response fluid temperature sensor wherein a semiconductor device is mounted on a relatively flat fin which is open on both sides to the fluid being sensed. In order to facilitate the connection of the silicon chip to the exterior conductors, a pair of fins are provided, the fins being generally dish-shaped to ensure air flow around the entirety of the assembly.

However, with the air flow flowing around the entire assembly, it is possible that, under certain circumstances, contaminants and other foreign material may cause damage to the chip and/or lead attached to the chip. It is this latter problem that the present invention addresses. The above-referenced co-pending disclosures are incorporated herein by reference.

SUMMARY OF THE INVENTION

This invention is a modification of the inventions described in the above-referenced applications wherein the fin is formed of a domed-shaped element which is sealingly fitted to a multiple plastic member and the semiconductor chip is mounted on the inside apex of the dome whereby the semiconductor chip and any conductors leading to the chip or the domed fin will be fully enclosed by the domed fin and the plastic molded member. In this way the connections and the semiconductor chip are fully protected from contaminants and mechanical injury due to foreign particles striking either the leads or the semiconductor chip. As will be noted from a further description of the device, a foamed material may be provided within the confined volume of the dome to further protect the semiconductor chip and leads connected therewith.

In selecting suitable fin material the following relationship is considered to be of significance in investigating the various characteristics of a material for its merit in conjunction with use in connection with the present invention. For maximum theoretical performance, the following relationship exists.

$$M_t = 8 K/(\rho)Sp.Hp.)]$$

where K = thermal conductivity,
$\rho$ = density, and
Sp.Hp = specific heat

The most desirable material is that which has properties maximizing the term $M_t$. In a practical application, other properties such as cost fabricability, environmental tolerance and availability may modify the material selection.

Accordingly, it is one object of the present invention to provide an improved fluid temperature sensing device.

It is another object of the present invention to provide improved temperature sensing device for a fluid having extremely fast dynamic and steady state performance of the type described wherein the semiconductor chip and connections are protected.

It is a further object of the present invention to provide an improved fluid temperature sensing device having a high surface area to mass ratio to enhance the transfer of heat from a heat transfer device to the actual temperature sensing element.

It is still another object of the present invention to provide an improved temperature sensing assembly utilizing a semiconductor chip which enhances the transfer of heat from the fluid whose temperature is being considered to the semiconductor chip while protecting the chip from contaminants and damage.

It is another object of the present invention to provide an improved fluid temperature sensing assembly which is inexpensive to manufacture, reliable in operation and easily installed.

Further objects, features and advantages of the present invention will become more readily apparent upon a consideration of the following specification when taken in conjunction with the attached drawings, in which:

DETAILED DESCRIPTION OF THE INVENTION

Figure 1:
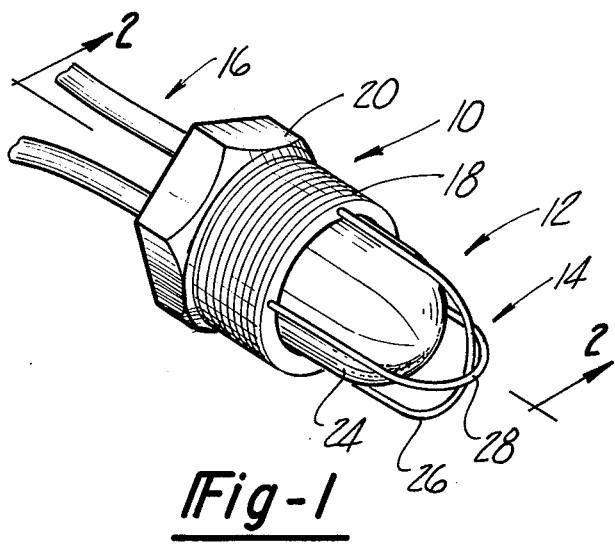
FIG. 1 is a perspective view of a preferred form of fast response fluid temperature sensor incorporating the features of the present invention.

Referring to FIG. 1, there is illustrated a fluid temperature sensor 8 which is extremely fast and highly stable in its response which includes a base member 10, a sensing assembly 12, a protective cage 14 for the sensing assembly 12, and a pair of external conductors 16 which are utilized to interconnect the dome and semiconductor chip to external circuitry. The base element 10 includes a threaded portion 18 which is adapted to be threaded, for example, into the air intake of an internal combustion engine or other device through which fluid is flowing and the temperature of that fluid is to be sensed. As is common in devices of this type, the base member 10 includes a hexagonal portion 20 which is utilized to tighten the sensor into position.

Figure 2:
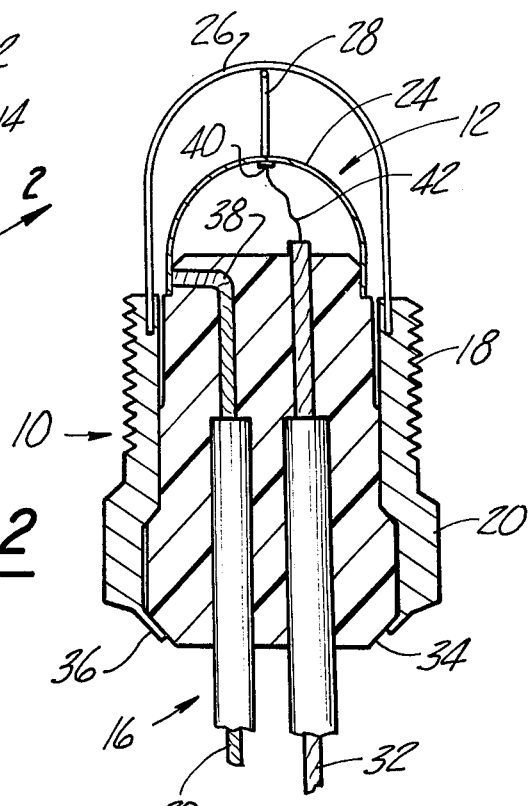
FIG. 2 is a cross-sectional view of the improved fluid temperature sensor of FIG. 1 taken along line 2—2 thereof and particularly illustrating the interconnections between the external conductors and the semiconductor chip and domed fin.

The sensing assembly 12 includes a domed fin 24 which, as can be seen from FIG. 2, is utilized to conduct heat to and away from a semiconductor chip while protecting the chip, and associated connecting conductors, from contaminants and other foreign material. The dome member 24, which is extremely thin to reduce its mass-to-area ratio as explained in the aforementioned applications, is protected by means of the cage 14 which includes a pair of U-shaped wires 26, 28 positioned at 90°, one relative to the other, and inserted into apertures formed in the base member 10 and suitably attached therein.

Referring now to FIG. 2, there is also illustrated a cross-section of the air temperature sensor of FIG. 1 to illustrate the interior portion of the temperature sensing element 12. As is seen from this drawing, the external conductor 16, which include a pair of conductive members 30, 32 are molded in a plastic member 34, which plastic member is rigidly seated within the base member 10. In order to ensue that the molded member 34 is rigidly positioned within the base member 10, a lip 36 is swaged over the bottom of the molded element 34 to securely position the molded member 34 within the cavity formed by the base member 10.

The conductor 30 is, in the embodiment shown in FIG. 2, turned at 90° at portion 38 and mechanically contacts the inner surface of the domed member 24 to effect an electrical connection between the conductor 30 and the fin 24. On the other hand, conductor 32 is led straight through the molded member 34 to a position above the top of the molded member 34 but within the confines of the fin 24. A connection is made between the top of conductor 32 and a semiconductor chip 40 by means of a fine gold wire 42 having a diameter of approximately 0.002 inches.

Thus, as is seen from FIG. 2, the chip 40, gold wire 42, and the interior portion of the domed fin 24 are protected from any contaminants or foreign material which may flow past the domed fin 24. As stated above, the interior of the domed fin 24 may be provided with foamed material to further mechanically protect the semiconductor chip 40 and the gold wire 42.

Figure 3:
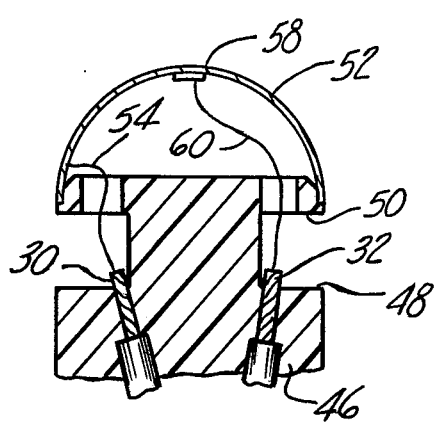
FIG. 3 is a cross-sectional view of a modified form of the improved fluid temperature sensor of FIG. 1 and particularly illustrating a modification of the manner in which the conductors are led through a molded plastic member.

Referring now to FIG. 3, there is illustrated a modified form of connections whereby the conductors 30, 32 are embedded in a modified molded plastic member 46. The plastic member 46 is modified by providing cutaway portions at surfaces 48 and 50 to provide access to the top of conductors 30, 32 which are now positioned outside of the confines of a domed fin 52.

The connections between the conductor 30 and the fin 52 is provided by a gold wire 54 having a diameter of approximately .002 inches, the gold wire being suitably fastened to the domed fin 52. As was the case with FIG. 2, a semiconductor chip 58 is mounted within the fin 52 and at the apex thereof, and the conductor 32 is interconnected therewith by a second gold wire 60. The bonding of the semiconductor 58 to the domed fin 52 may be by any suitable methods, as for example, by gold bonding techniques. The domed fin 52 is press-fitted onto the upper end of the plastic molded member 46 and fixed thereto.

Figure 4:
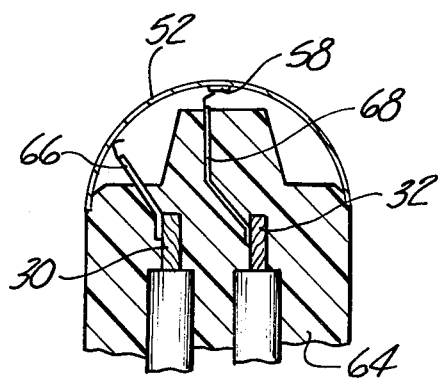
FIG. 4 is a cross-sectional view of a further modified form of the temperature sensor of the present invention and illustrating an alternative method of interconnecting the external conductors to the semiconductor chip and the doomed fin.

Referring now to FIG. 4, there is illustrated a further modification of the invention disclosure wherein the domed element 52 is again provided with a semiconductor chip 58. However, a molded member 64 is shown as being modified from that previously described except that the domed fin 52 is again press-fitted onto the plastic molded member 64 and suitably attached thereto. In the case of FIG. 4, the conductor 30 is provided at its upper end thereof with a flexible whisker-type lead 66 which is in wiping contct with the domed fin 52 thereby providing electrical connection thereto. On the other hand, the conductor 32 is provided with a slightly longer flexible whisker-type lead 68 which is in wiping contact with the semiconductor chip 58.

Figure 5:
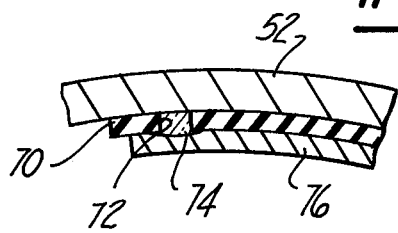
FIG. 5 is a cross-sectional view of a further modified form of the temperature sensor illustrating applying the temperature responsive element with thick film techniques.

FIG. 5 illustrates the invention as applied by thick film techniques, although it is to be understood thin film techniques apply equally as well. Referring to FIG. 5, fin 52 forms the substrate of which the various layers are deposited by the screening process. In carrying out the process, an insulating strip 70 is deposited on the fin 52 with an aperture 72 formed in the strip 70 by either blocking the area of the aperture 72 with an emulsion or by etching the area of the aperture from the strip. A semiconductor portion 74 is then deposited in the aperture 72 in contact with the fin 52. Finally a strip conductor 76 is deposited on the semiconductor 74 and on strip 70, maintaining the conductor 76, within the confines thereof, to form the conductive strip corresponding to the conductor 42 or 60. In the thin film counterpart, the various layers are sputtered or evaporated with the masking or etching desired to form the shapes needed.

Having described a preferred embodiment of the invention and several modifications thereof, it will be understood that the examples given are employed in a descriptive sense only and not for purposes of limitation. Other embodiment and variations will be obvious to those skilled in the art and be made without deploying from the spirit and scope of my invention which is limited only by the appended claims.

I claim:

1. A temperature sensor for sensing the temperature of a fluid comprising a base member formed of molded material, fin means formed in a thin sheet in a generally hemispherical dome-like shape having a high surface area to mass ratio, said fin means being fixedly mounted on said base member in sealing engagement therewith and forming a cavity within the interior of the dome formed by said fin means, the fluid being sensed flowing over the outer surface of said fin means and being precluded from entering said cavity, semiconductor means mounted on said fin means within said cavity and having a characteristic which varies with changes in temperature, a first output conductor at least partially molded in said base member and connected to said fin means, a second output conductor electrically insulated from said fin means and connected to a surface of said semiconductor means, and cage means supported spaced from the exterior surface of said fin means in partial, surrounding relation thereto, said cage means being formed from a plurality of wires having a generally U-shape with said wires being joined at the apex of the wires.

2. The improvement of claim 1 wherein said semiconductor means is deposited on said fin means by thick film techniques.

3. The improvement of claim 1 wherein said semiconductor means is deposited on said fin means by thin film techniques.

4. The improvement of claim 1 wherein said second conductor is a whisker element in resilient engagement with said semiconductor means.

5. The improvement of claim 1 wherein said temperature sensor further includes a connector element having a threaded portion for attaching said temperature sensor to a member through which the fluid to be sensed is flowing, said cage assembly being fixingly attached to said connector to enclose at least a portion of said base member said fin means and said semiconductor means.

6. The improvement of clam 5 wherein said connector member is generally circular shaped, said base member being received within the interior of said connector, said connector having a portion thereof swaged to retain said base member within the confines of said connector.

7. The improvement of claim 6 wherein said fin means is formed with an aperture therein and said first conductor is led through said base member and being bent over into engagement with the surface of said fin means and electrically connected therewith.

* * * * *

UNITED STATES PATENT AND TRADEMARK OFFICE
CERTIFICATE OF CORRECTION

PATENT NO.   : 4,142,170
DATED        : February 27, 1979
INVENTOR(S)  : Albert Blatter It is certified that error appears in the above—identified patent and that said Letters Patent are hereby corrected as shown below:

Column 2, line 26, change "8K" to --K--.

Column 3, line 56, change "ensue" to --ensure--.

Column 4, line 39, change "contct" to --contact--.

Column 6, line 17, (line 1 of Claim 6) change "clam" to
    --claim--.

Signed and Sealed this

Fifth Day of June 1979

[SEAL]

Attest:

RUTH C. MASON
Attesting Officer

DONALD W. BANNER
Commissioner of Patents and Trademarks